US010915274B2

(12) United States Patent
Yasui (10) Patent No.: US 10,915,274 B2
(45) Date of Patent: Feb. 9, 2021

(54) COMPUTER-READABLE MEDIUM, COMMUNICATION SYSTEM, AND METHOD FOR MAKING IT EASIER TO IMAGINE OUTPUT IMAGE FROM EACH SELECTABLE PRINTER

(71) Applicant: BROTHER KOGYO KABUSHIKI KAISHA, Nagoya (JP)

(72) Inventor: Ryo Yasui, Nagoya (JP)

(73) Assignee: Brother Kogyo Kabushiki Kaisha, Naagoya (JP)

( * ) Notice: Subject to any disclaimer, the term of this patent is extended or adjusted under 35 U.S.C. 154(b) by 0 days.

(21) Appl. No.: 16/536,965

(22) Filed: Aug. 9, 2019

(65) Prior Publication Data

US 2020/0097227 A1 Mar. 26, 2020

(30) Foreign Application Priority Data

Sep. 25, 2018 (JP) .................................. 2018-178798

(51) Int. Cl.
G06F 3/12 (2006.01)
(52) U.S. Cl.
CPC ............ G06F 3/1208 (2013.01); G06F 3/126 (2013.01); G06F 3/1256 (2013.01); G06F 3/1292 (2013.01)
(58) Field of Classification Search
CPC ........... H04N 1/00161; H04N 1/00164; H04N 1/0044; G06F 3/1208; G06F 3/1256; G06F 3/126; G06F 3/1232; G06F 3/1292
See application file for complete search history.

(56) References Cited

U.S. PATENT DOCUMENTS

2013/0135672 A1* 5/2013 Watanabe ............. G06F 3/1256
358/1.15
2014/0055813 A1* 2/2014 Kim ...................... G06F 3/1247
358/1.15
(Continued)

FOREIGN PATENT DOCUMENTS

| JP | 2005-64551 A | 3/2005 |
| JP | 2016-136364 A | 7/2016 |
| JP | 2016-192739 A | 11/2016 |

*Primary Examiner* — Kent Yip
(74) *Attorney, Agent, or Firm* — Scully, Scott, Murphy & Presser, PC (57) ABSTRACT

A non-transitory computer-readable medium stores computer-readable instructions executable by a processor coupled with a terminal device. The instructions are configured to, when executed by the processor, cause the terminal device to receive, via a short-range wireless communication interface, configuration information from each of printers positioned within a communicable range of short-range wireless communication with the terminal device, each configuration information representing a configuration of a corresponding printer, display selectable printers and preview images based on the configuration information and an object, the selectable printers being extracted based on the configuration information, each preview image representing an image of the object in accordance with the configuration information of a corresponding selectable printer, accept a selection from the selectable printers, transmit, to the selected printer, a communication instruction to establish communication between the terminal device and the selected printer, and transmit a print instruction to the selected printer via the established communication.

12 Claims, 6 Drawing Sheets

(56) References Cited

U.S. PATENT DOCUMENTS

| | | | |
|---|---|---|---|
| 2014/0253965 A1* | 9/2014 | Asai | G06F 3/1255 358/1.15 |
| 2015/0169263 A1* | 6/2015 | Asai | G06F 3/1286 358/1.15 |
| 2016/0216927 A1 | 7/2016 | Fujii et al. | |

* cited by examiner

COMPUTER-READABLE MEDIUM, COMMUNICATION SYSTEM, AND METHOD FOR MAKING IT EASIER TO IMAGINE OUTPUT IMAGE FROM EACH SELECTABLE PRINTER

CROSS-REFERENCE TO RELATED APPLICATION

This application claims priority under 35 U.S.C. § 119 from Japanese Patent Application No. 2018-178798 filed on Sep. 25, 2018. The entire subject matter of the application is incorporated herein by reference.

BACKGROUND

Technical Field

Aspects of the present disclosure are related to a non-transitory computer-readable medium, a communication system, and a method for making it easier to imagine in advance an output image from each selectable printer.

Related Art

Heretofore, various wireless communication technologies have been proposed. As an example of the technologies, a terminal device has been known that is configured to communicate with one or more printers via short-range wireless communication such as Bluetooth (registered trademark) Low Energy (hereinafter referred to as "BLE").

SUMMARY

More specifically, in the known technology, the terminal device may obtain attribute information (e.g., a sheet size) from each of the one or more printers, and may display the attribute information with characters, for instance, so as to assist a user in selecting an intended one of the one or more printers. Thus, referring to the attribute information displayed with the characters makes it easier for the user to select the intended printer. However, the known technology still has a problem that the user is unable to easily imagine in advance an output image from each selectable printer only by referring to the attribute information displayed with the characters.

Aspects of the present disclosure are advantageous to provide one or more improved techniques that make it easier for a user to imagine in advance an output image from each selectable printer in an attempt to select an intended one of the selectable printers.

According to aspects of the present disclosure, a non-transitory computer-readable medium is provided, which stores computer-readable instructions that are executable by a processor coupled with a terminal device including a short-range wireless communication interface and a display, the computer-readable instructions being configured to, when executed by the processor, cause the terminal device to receive, via the short-range wireless communication interface, configuration information from each of one or more printers positioned within a communicable range of short-range wireless communication with the terminal device, each configuration information representing a configuration of a corresponding one of the one or more printers, control the display to display one or more selectable printers and one or more preview images based on the received configuration information and an object printable by the one or more selectable printers, the one or more selectable printers being extracted from the one or more printers based on the received configuration information, each preview image representing an image of the object in accordance with the configuration information of a corresponding selectable printer, accept a selection from the one or more selectable printers displayed on the display, transmit, to a selected printer identified by the accepted selection, a communication instruction to establish communication between the terminal device and the selected printer; and transmit a print instruction to the selected printer via the established communication.

According to aspects of the present disclosure, further provided is a communication system including a terminal device, and one or more printers positioned within a communicable range of short-range wireless communication with the terminal device. Each printer includes a first communication interface configured to perform the short-range wireless communication with the terminal device, and a first controller configured to transmit configuration information representing a configuration of each printer. The terminal device includes a display, a second communication interface configured to perform the short-range wireless communication with the one or more printers, and a second controller configured to receive, via the second communication interface, the configuration information from each printer, control the display to display one or more selectable printers and one or more preview images based on the received configuration information and an object printable by the one or more selectable printers, the one or more selectable printers being extracted from the one or more printers based on the received configuration information, each preview image representing an image of the object in accordance with the configuration information of a corresponding selectable printer, accept a selection from the one or more selectable printers displayed on the display, transmit, to a selected printer identified by the accepted selection, a communication instruction to establish communication between the terminal device and the selected printer, and transmit a print instruction to the selected printer via the established communication. The first controller of the selected printer is further configured to receive the print instruction from the terminal device, and perform printing in accordance with the received print instruction.

According to aspects of the present disclosure, further provided is a method implementable on a processor coupled with a terminal device including a short-range wireless communication interface and a display. The method includes receiving, via the short-range wireless communication interface, configuration information from each of one or more printers positioned within a communicable range of short-range wireless communication with the terminal device, each configuration information representing a configuration of a corresponding one of the one or more printers, controlling the display to display one or more selectable printers and one or more preview images based on the received configuration information and an object printable by the one or more selectable printers, the one or more selectable printers being extracted from the one or more printers based on the received configuration information, each preview image representing an image of the object in accordance with the configuration information of a corresponding selectable printer, accepting a selection from the one or more selectable printers displayed on the display, transmitting, to a selected printer identified by the accepted selection, a communication instruction to establish communication between the terminal device and the selected printer, and transmitting a print instruction to the selected printer via the established communication.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Figure 1:
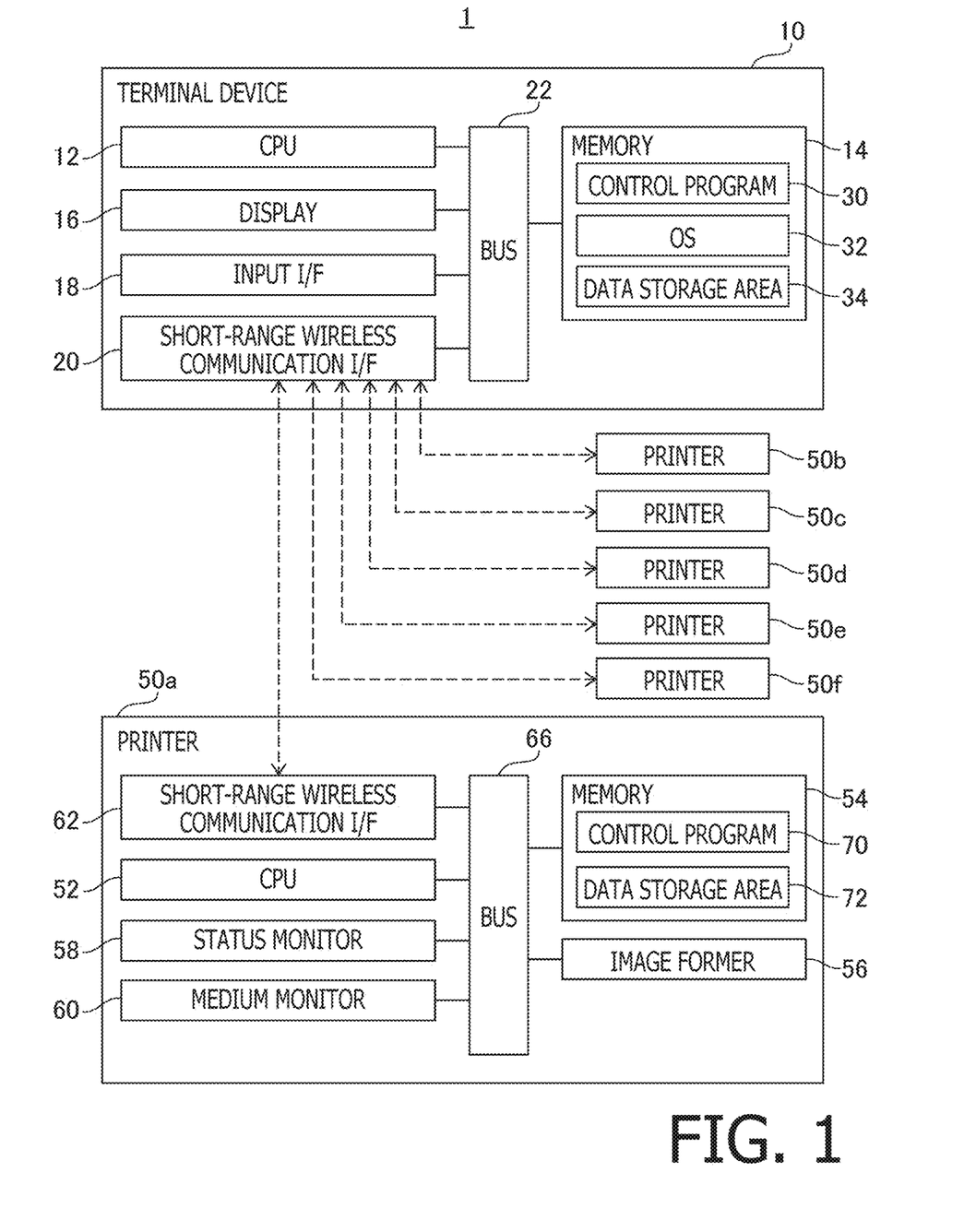
FIG. 1 is a block diagram schematically showing a configuration of a communication system including a terminal device and printers, in an illustrative embodiment according to one or more aspects of the present disclosure.

Hereinafter, an illustrative embodiment according to aspects of the present disclosure will be described with reference to the accompanying drawings. FIG. 1 is a block diagram schematically showing a configuration of a communication system 1 of the illustrative embodiment. As shown in FIG. 1, the communication system 1 includes a terminal device 10 and printers 50a, 50b, 50c, 50d, 50e, and 50f.

Examples of the terminal device 10 may include, but are not limited to, mobile terminals such as notebook PCs, smartphones, and tablet PCs. The terminal device 10 includes a CPU 12, a memory 14, a display 16, an input I/F ("I/F" is an abbreviation of "interface") 18, and a short-range wireless communication I/F 20. These elements included in the terminal device 10 are communicably interconnected via a bus 22.

The CPU 12 is configured to perform processing according to a control program 30 and an OS 32 stored in the memory 14. The control program 30 is an application program for causing the printers 50 to perform image formation. The OS 32 is a program to provide basic functions usable by the control program 30. It is noted that, hereinafter, the CPU 12 executing a program such as the control program 30 may be merely referred to as a name of the program. For instance, in the following descriptions, an expression "the control program 30" may implicitly denote "the CPU 12 executing the control program 30."

The memory 14 has a data storage area 34. The data storage area 34 is an area to store various types of data such as data necessary for execution of the control program 30.

The memory 14 may include at least one of storage devices such as a RAM, a ROM, a flash memory, an HDD, and a buffer for the CPU 12.

The memory 14 may include one or more non-transitory computer-readable storage media. Examples of the non-transitory computer-readable storage media may include, but are not limited to, a CD-ROM and a DVD-ROM besides the above-exemplified storage devices. The non-transitory computer-readable storage media are tangible media. Meanwhile, electric signals carrying programs downloaded from a server on the Internet may be classified as computer-readable signal media but are not included in the non-transitory computer-readable storage media.

The display 16 is configured to display various kinds of information for the terminal device 10. Examples of the display 16 may include, but are not limited to, an LCD and an organic EL display. The input I/F 18 may include a keyboard and a mouse. The input I/F 18 is configured to accept user operations. Instead of or in addition to the keyboard, the input I/F 18 may include a membranous touch sensor laid on a display surface of the display 16.

The short-range wireless communication I/F 20 is configured to perform BLE communication based on IEEE 802.15.1 standard or other equivalent standards. It is noted that "BLE" is an abbreviation of "Bluetooth (registered trademark) Low Energy." Hence, when brought into a state wirelessly communicable in accordance with a BLE protocol, the terminal device 10 may perform data communication with the printers 50.

The printers 50a to 50f have a lot of elements and structures in common with each other. Therefore, the following description will be directed representatively to the printer 50a. The printer 50a includes a CPU 52, a memory 54, an image former 56, a status monitor 58, a medium monitor 60, and a short-range wireless communication I/F 62. These elements included in the printer 50a are communicably interconnected via a bus 66.

The CPU 52 is configured to perform processing according to a control program 70 stored in the memory 54. The control program 70 is a program for performing image formation. The memory 54 has a data storage area 72. The data storage area 72 is an area to store various types of data such as data necessary for execution of the control program 70. The memory 54 may include at least one of storage devices such as a RAM, a ROM, a flash memory, an HDD, and a buffer for the CPU 52.

The image former 56 is configured to perform image formation on a print medium in accordance with processing by the CPU 52 executing the control program 70. In the illustrative embodiment, each of the printers 50a, 50b, 50c, 50d, and 50e employs a label as the print medium, and is configured to perform image formation on the label. Meanwhile, the printer 50f employs a cut sheet as the print medium, and is configured to perform image formation on the cut sheet. Namely, the printers 50a, 50b, 50c, 50d, and 50e are label printers, and the printer 50f is a common printer.

The status monitor 58 is configured to monitor a status of the printer 50a such as whether or not there is a print medium set for the printer 50a and whether a cover is open or closed. Each time the status of the printer 50a is updated, the status monitor 58 may transmit status information regarding the status of the printer 50a to the memory 54. The medium monitor 60 is configured to monitor a print medium set for the printer 50a. Each time the print medium set for the printer 50a is changed, the medium monitor 60 may transmit medium information regarding the print medium set for the printer 50*a* to the memory 54.

The short-range wireless communication I/F 62 is configured to perform BLE communication based on the same standard as for the short-range wireless communication I/F 20 of the terminal device 10. Thereby, when brought into a state wirelessly communicable in accordance with a BLE protocol, the printer 50*a* may perform data communication with the terminal device 10.

The following descriptions mainly set forth processes by the CPU 12 in accordance with computer-readable program instructions. Namely, in the following descriptions, processes such as "judging," "determining," "extracting," "selecting," "specifying," "calculating," "obtaining," "acquiring," "accepting," "receiving," "transmitting," and "controlling" represent processes by the CPU 12. The processes by the CPU 12 may include hardware control via the OS 32. It is noted that "obtaining" or "acquiring" may be used as a concept that does not necessarily need a request. Namely, a process of the CPU 12 receiving data without making a request for the data may be contained in a concept "the CPU 12 obtains/acquires the data." Further, "data" to be referred to in the following descriptions may be expressed as a computer-readable bit string. Further, two or more pieces of data having substantially the same value but having respective different formats may be treated as the same data. The same applies to "information." Further, processes such as "instructing," "responding," and "requesting" may be performed by transmitting information representing an "instruction," a "response," and a "request." Further, processes such as "setting" and "configuring" may be performed by storing input setting information into a memory (e.g., the memory 14).

In the communication system 1 configured as above, the terminal device 10 transmits print image data to a specified printer 50 via the BLE communication, and the specified printer 50 performs image formation based on the received print image data. Hereinafter, processes in the communication system 1 will be described.

First, via the BLE communication according to one of the short-range wireless communication standards, each of the printers 50*a* to 50*f* transmits a beacon signal referred to as an "advertising packet." The advertising packet is not transmitted to a specified device but is concurrently transmitted to a plurality of unspecified devices. Namely, the advertising packet is broadcasted.

The advertising packet includes address information, a local name, status information, medium information, and model information. The address information represents an address used for communication with a relevant printer 50 that has transmitted the corresponding advertising packet. The local name is information for identifying the relevant printer 50 that has transmitted the corresponding advertising packet. For instance, the local name may include at least one of, preferably both of, a model name and a serial number of the relevant printer 50. The status information is, as described above, information representing the status of the relevant printer 50 that has transmitted the corresponding advertising packet. The medium information represents a type of a print medium set for the relevant printer 50 that has transmitted the corresponding advertising packet. More specifically, the medium information may contain a type (e.g., a thermal sheet, a laminated sheet, a die-cut sheet, and a rolled sheet) of the label, a width of the label, and a color of an object to be printed on the label. The model information represents a model of the relevant printer 50.

The terminal device 10 receives an advertising packet from each printer 50 which is positioned within a communicable range of the BLE communication with the terminal device 10. Then, based on the status information and/or the medium information contained in the received advertising packet, the terminal device 10 displays, as a preview image, a print image to be formed by the corresponding printer 50 that has transmitted the received advertising packet. The preview image functions as a selectable button for selecting the corresponding printer 50 as an intended printer from among available printers. Thus, the user may select the intended printer from among the available printers after confirming the print image to be formed by the intended printer.

After the intended printer is selected in response to a user operation to the preview image, the terminal device 10 establishes BLE communication with the selected printer by using the address information contained in the advertising packet transmitted by the selected printer. Then, the terminal device 10 transmits image data and a print instruction to the selected printer, thereby causing the selected printer to perform image formation.

It is noted that the terminal device 10 may display, as selectable buttons, only one or more preview images corresponding to printers capable of performing user-desired image formation among printers 50 communicable with the terminal device 10. Specifically, for instance, the terminal device 10 may be set to display only one or more preview images corresponding to label printers among the communicable printers 50 when the user adopts a label as the print medium. Further, the terminal device 10 may be set to display only one or more preview images corresponding to printers capable of printing barcodes among the label printers. The above settings for the terminal device 10, i.e., the setting (hereinafter referred to as the "label printer display setting") for displaying only one or more preview images corresponding to the label printers and the setting (hereinafter referred to as the "barcode printing display setting") for displaying only one or more preview images corresponding to the printers capable of printing barcodes, may be set via a setting screen (not shown) that is displayed in accordance with processing by the CPU 12 executing the control program 30.

Further, the terminal device 10 may accept a real-time update setting therefor. In a state where the real-time update setting is active, when the status information and/or the medium information of a printer corresponding to one of preview images being displayed is updated, the preview image is redisplayed based on the updated information. Specifically, as described above, each preview image is displayed based on the corresponding status information and/or the corresponding medium information. The status information and the medium information may be updated on the corresponding printer. For instance, there may be case where the user removes a print medium (e.g., a label) from the printer. In such a case, the status information is updated from information representing that the print medium is set for the printer to information representing that there is no print medium set for the printer. Further, for instance, there may be a case where the user exchanges a label with a width of 6 mm that is set for the printer for another label with a width of 12 mm. In such a case, the medium information is updated from information representing the label with a width of 6 mm to information representing the label with a width of 12 mm. It is noted that hereinafter, the status information, the medium information, and the model information may be collectively referred to as "configuration information."

Therefore, when the configuration is updated on a printer corresponding to a preview image while the preview image is being displayed, the preview image is redisplayed based on the updated configuration information. Specifically, for instance, when a label with a width of 6 mm is set for the printer 50a, a preview image associated with the label with a width of 6 mm is displayed. Then, when the label with a width of 6 mm is replaced with a label with a width of 12 mm, a preview image associated with the label with a width of 12 mm is displayed instead of the preview image associated with the label with a width of 6 mm.

The real-time update setting may be set via a setting screen (not shown) that is displayed in accordance with processing by the CPU 12 executing the control program 30. When the real-time update setting is active, the preview image is redisplayed in response to the configuration information being updated. Meanwhile, when the real-time update setting is inactive, the preview image is not redisplayed even after the configuration information is updated.

Hereinafter, an explanation will be provided of processes to be performed by the printers 50 and the terminal device 10 in the communication system 1, with reference to FIGS. 2 to 4.

As described above, in each of the printers 50a to 50f, each time the configuration information is updated, the updated configuration information is transmitted from the status monitor 58 and/or the medium monitor 60 into the memory 54. Then, each printer 50a to 50f transmits an advertising packet including the updated configuration information (S100 in FIG. 2). The configuration information is previously defined by a vendor, using identifiers such as UUID ("UUID" is abbreviation of "Universally Unique Identifier"), Major, and Minor associated with the status and/or the medium type of an individual printer 50. Namely, each printer 50 transmits the advertising packet including the identifiers (e.g., UUID, Major, and Minor) associated with the configuration information output from the status monitor 58 and/or the medium monitor 60. At this time, the OS 32 of the terminal device 10 receives the advertising packet from each printer 50 positioned within the communicable range of the BLE communication with the terminal device 10. It is noted that hereinafter, the address information, the local name, the status information, the medium information, and the model information included in the advertising packet may be collectively referred to as "packet information."

Subsequently, in response to receiving the advertising packet from a printer 50, the OS 32 provides the control program 30 with the packet information included in the received advertising packet (S102). Then, in response to receiving the packet information, the control program 30 stores the received packet information into the data storage area 34 (S104). In the illustrative embodiment, the control program 30 receives the packet information of each of the six printers 50a to 50f, and stores the received packet information of each printer 50a to 50f into the data storage area 34.

Figure 5:
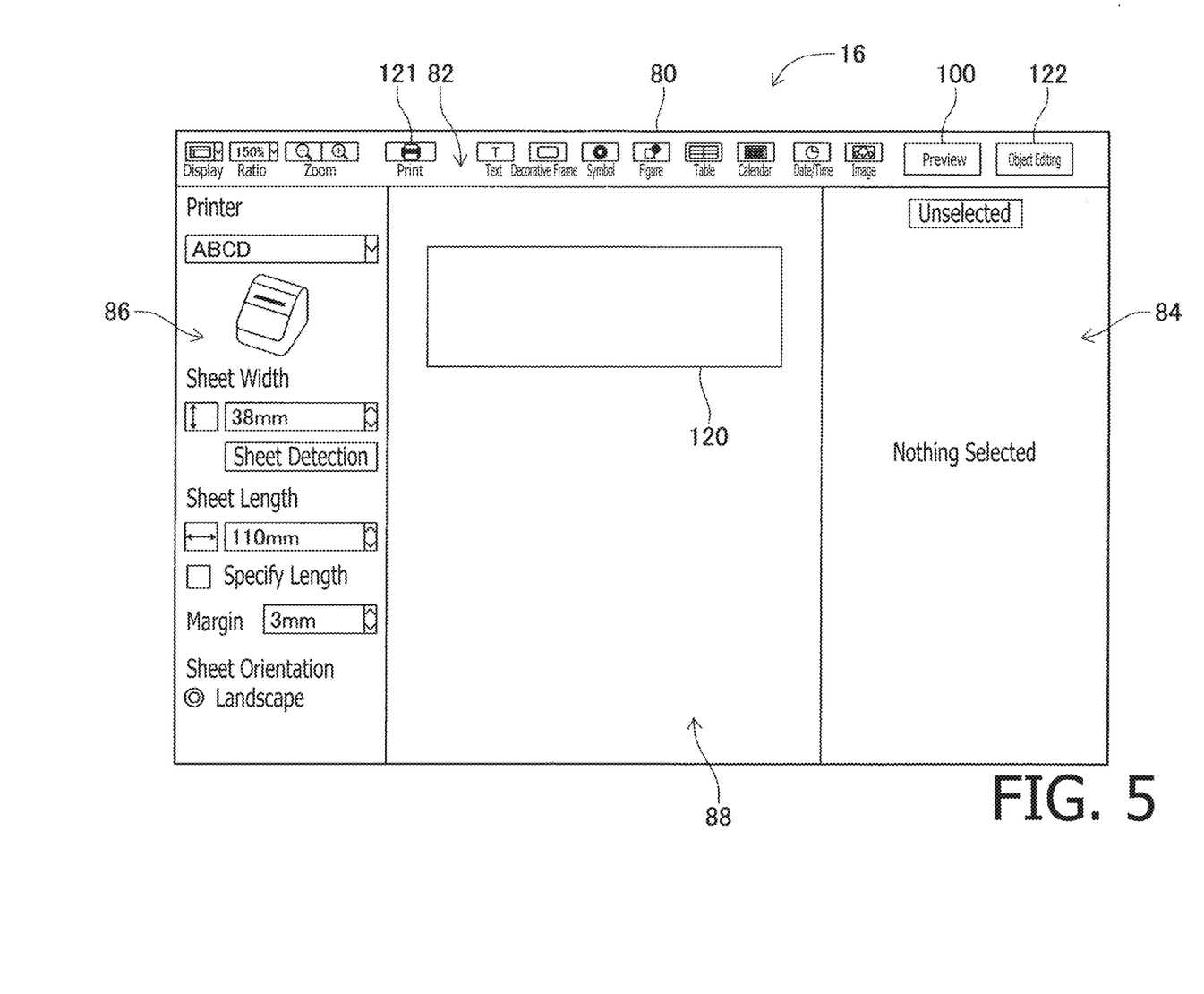
FIG. 5 is an edit screen for editing a target image to be printed, in the illustrative embodiment according to one or more aspects of the present disclosure.

Further, the control program 30 causes the display 16 to display an edit screen 80 as shown in FIG. 5. The edit screen 80 is for editing a target image to be printed. The edit screen 80 includes an operation area 82, a preview area 84, a printer information area 86, and an edit area 88. The operation area 82 includes a plurality of operable buttons displayed therein. The preview area 84 is an area in which preview images are displayed as selectable buttons. The printer information area 86 is configured to, when one of the preview images displayed as the selectable buttons is selected, display information regarding a selected printer associated with the selected preview image. The edit area 88 is for editing the target image to be printed.

In response to accepting a user operation to a preview button 100 displayed in the operation area 82 (S106), the control program 30 extracts respective packet information of one or more printers capable of label printing in accordance with the label printer display setting (S108). Specifically, the data storage area 34 stores information (hereinafter referred to as "label printing model information") regarding models of the printers capable of label printing. Then, the control program 30 extracts packet information that includes model information conforming to the label printing model information, from among all the packet information (hereinafter referred to as the "stored packet information") stored into the data storage area 34 in S104. The label printing model information includes the respective model information of the printers 50a, 50b, 50c, 50d, and 50e since the printers 50a, 50b, 50c, 50d, and 50e are label printers. Namely, the respective model information of the printers 50a, 50b, 50c, 50d, and 50e conforms to the label printing model information. Hence, according to the label printer display setting, the respective packet information of the printers 50a, 50b, 50c, 50d, and 50e is extracted.

Subsequently, the control program 30 extracts respective packet information of one or more printers capable of barcode printing, in accordance with the barcode printing display setting (S110). Specifically, the data storage area 34 stores information (hereinafter referred to as "barcode printing information") regarding print media usable for barcode printing. Then, the control program 30 extracts packet information that includes medium information conforming to the barcode printing information, from among all the stored packet information (or all the packet information extracted in S108). Each of the printers 50a, 50b, 50c, and 50d has a cartridge of print medium usable for barcode printing. Meanwhile, the printer 50e has a cartridge of print medium unusable for barcode printing. Therefore, the barcode printing information includes the respective medium information of the printers 50a, 50b, 50c, and 50d but does not includes the medium information of the printer 50e. Namely, the respective medium information of the printers 50a, 50b, 50c, and 50d conforms to the barcode printing information. Hence, according to the barcode printing display setting, the respective packet information of the printers 50a, 50b, 50c, and 50d is extracted. It is noted that the packet information of a printer with no cartridge of print medium attached includes a blank (or information representing that there is no print medium set) as the medium information, and therefore is not extracted.

Then, the control program 30 causes the display 16 to display a selection screen (see FIG. 6) in the preview area 84 of the edit screen 80, based on the extracted packet information (S112). The selection screen 110 includes selectable buttons 112a, 112b, 112c, and 112d displayed thereon in accordance with the extracted packet information. Each of the selectable buttons 112a, 112b, 112c, and 112d is for selecting a corresponding one of the printers 50a, 50b, 50c, and 50d. Each of the selectable buttons 112a, 112b, 112c, and 112d includes a local name displayed thereon that is included in the packet information of a corresponding one of the printers 50a, 50b, 50c, and 50d.

Figure 6:
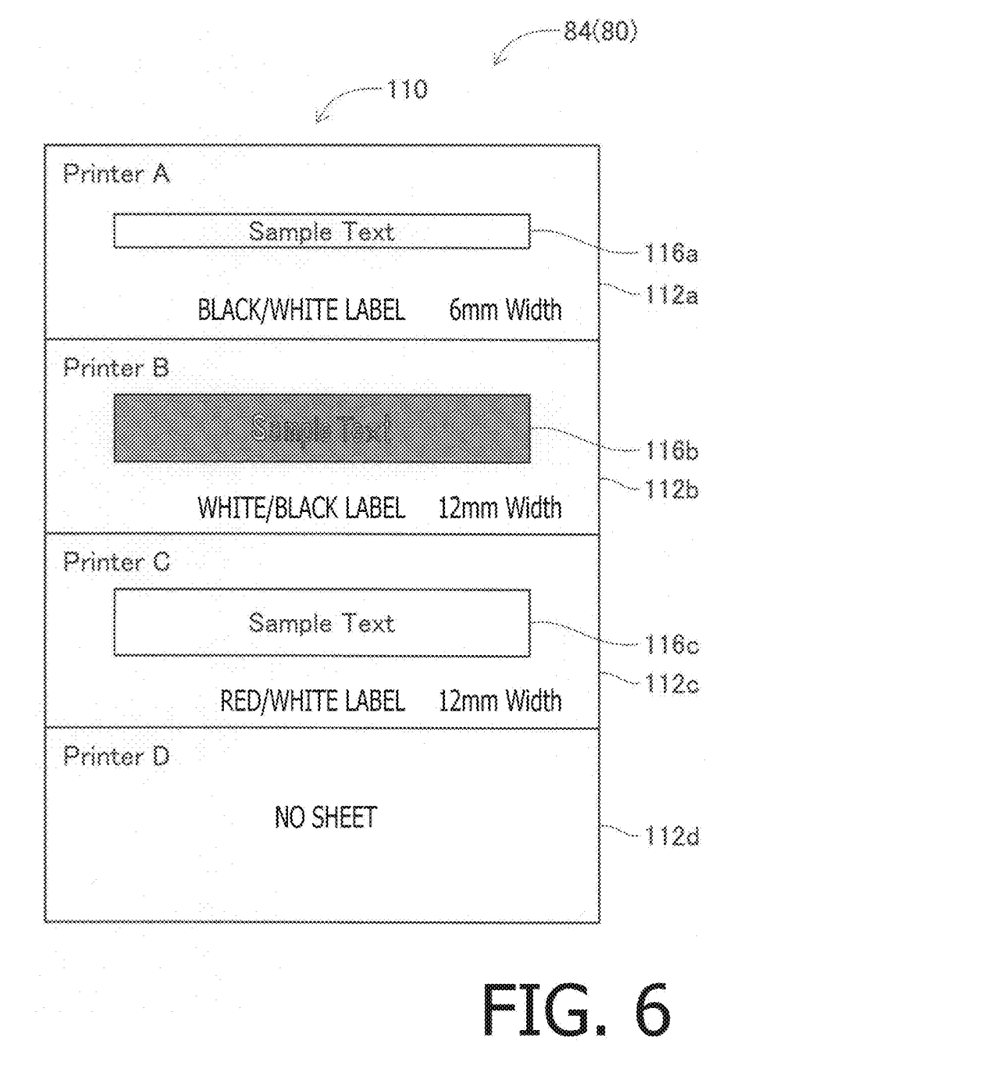
FIG. 6 is a selection screen for selecting an intended one of selectable printers, in the illustrative embodiment according to one or more aspects of the present disclosure.

Further, on each of the selectable buttons 112a, 112b, and 112c, a corresponding one of preview images 116a, 116b, and 116c is displayed, based on the medium information included in the packet information of a corresponding one of the printers 50a, 50b, and 50c. Each of the preview images 116a, 116b, and 116c is an image of a particular object (hereinafter referred to as a "preview-purpose object") inserted onto a print medium (i.e., a label) represented by the relevant medium information. In the illustrative embodiment, "Sample Text" is employed as the preview-purpose object.

Specifically, the printer 50a is set in association with a white label having a width of 6 mm on which an object is printed in black. Therefore, on the selectable button 112a, the preview image 116a is displayed as a black preview-purpose object put on a white label having a width of 6 mm. Further, the printer 50b is set in association with a black label having a width of 12 mm on which an object is printed in white. Therefore, on the selectable button 112b, the preview image 116b is displayed as a white preview-purpose object put on a black label having a width of 12 mm. Further, the printer 50c is set in association with a white label having a width of 12 mm on which an object is printed in red. Therefore, on the selectable button 112c, the preview image 116c is displayed as a red preview-purpose object put on a white label having a width of 12 mm.

The printer 50d has a cartridge of print medium attached thereto but has an insufficient amount of print medium remaining. Hence, no preview image is allowed to be displayed based on the medium information included in the packet information of the printer 50d. Therefore, on the selectable button 112d, a status of the printer 50d is displayed that is represented by the status information included in the packet information of the printer 50d. Specifically, in this case, as shown in FIG. 6, a message representing that there is an insufficient amount of print medium remaining in the printer 50d is displayed on the selectable button 112d, as the status of the printer 50d.

Further, as described above, in each of the printers 50a to 50f, when the print medium set thereon is exchanged, or the status thereof is changed (S120 in FIG. 3), the configuration information (more specifically, the medium information or the status information included in the configuration information) thereof is updated (S122). Then, each printer 50a to 50f transmits an advertising packet including the updated configuration information (S124). At this time, the OS 32 of the terminal device 10 receives the advertising packet from each printer 50 positioned within the communicable range of the BLE communication with the terminal device 10. Then, the OS 32 provides the control program 30 with the packet information included in the received advertising packet (S126).

In response to receiving the packet information, the control program 30 updates the stored packet information with the received packet information (S128). Then, the control program 30 determines whether the real-time update setting is active (S130). When determining that the real-time update setting is active (S130: Yes), the control program 30 causes the display 16 to redisplay a selection screen 110, based on the configuration information included in the stored packet information updated in S128 (S134). It is noted that how the selection screen 110 is displayed in S134 is substantially the same as in S112, and therefore, a detailed explanation thereof will be omitted. Further, when determining that the real-time update setting is inactive (S130: No), the control program 30 causes the display 16 to continuously display the selection screen 110 displayed in S112, without redisplaying a selection screen 110.

Then, in response to accepting a user operation to a specified one of the selectable buttons 112a, 112b, 112c, and 112d on the selection screen 110, the control program 30 accepts, as a selected printer, a printer associated with the specified one of the selectable buttons 112a to 112d (S136). Subsequently, the control program 30 provides the OS 32 with a communication instruction to establish BLE communication with the selected printer by using the address information included in the stored packet information of the selected printer (S138). In response to receiving the communication instruction, the OS 32 transmits a connection request to the selected printer, thereby establishing BLE communication with the selected printer (S140).

Further, on the terminal device 10, when the selected printer is specified via the selection screen 110, as shown in FIG. 5, a label image 120 representing a label according to the medium information included in the packet information of the selected printer is displayed in the edit area 88 of the edit screen 80. Then, in accordance with a user operation of editing the label image 120 and inserting an object onto the label image 120, a target image to be printed is created. Subsequently, after the target image to be printed has been created, the control program 30 accepts a user operation to a print button 121 displayed on the operation area 82 (S150 in FIG. 4).

Then, the control program 30 provides the OS 32 with a print instruction along with image data of the target image created through the user operation of editing the label image 120 (S152). Next, in response to receiving the image data and the print instruction, the OS 32 transmits the image data and the print instruction to the selected printer via the BLE communication (S154). Thereby, the selected printer performs image formation based on the image data received from the terminal device 10 (S156).

Thus, on the terminal device 10, the preview images 116a, 116b, and 116c are displayed on the selectable buttons 112a, 112b, and 112c, respectively. Therefore, the user may intuitively select an intended printer while checking the print images to be formed by printers 50 positioned around the terminal device 10 prior to establishing BLE communication between the terminal device and the intended printer. In the foregoing description, "Sample Text" is employed as the preview-purpose object. Nonetheless, any object may be employed as the preview-purpose object. Specifically, as shown in FIG. 5, there is an edit button 122 displayed in the operation area 82 of the edit screen 80. The control program 30 may accept a user operation to the edit button 122 (S158 in FIG. 4). In response to accepting a user operation of editing the preview-purpose object (S160), the control program 30 changes the preview-purpose object to a particular object specified by the user. Afterward, in response to accepting a user operation to the preview button 100, the control program 30 causes the display 16 to display the selection screen 110 by using the particular object specified by the user. Thereby, for instance, in an attempt to print a barcode, the user may check and confirm a more appropriate print image to be formed, by employing a barcode as the preview-purpose object.

Further, the terminal device 10 may accept the label printer display setting and the barcode printing display setting as arbitrarily set by the user. Thereby, the terminal device 10 may display, on the selection screen 110, only one or more printers capable of performing a user-desired printing process among the printers 50 communicable with the terminal device 10. Thus, the communication system 1 of the illustrative embodiment is provided as a more user-friendly communication system.

Further, the terminal device 10 may accept the real-time update setting as arbitrarily set by the user. Thereby, the terminal device 10 may, immediately after the configuration information is updated, reflect the updated configuration information on the selection screen 110. Thus, the user is allowed to certainly select an intended printer via the selection screen 110.

Hereinabove, the illustrative embodiment according to aspects of the present disclosure has been described. Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that aspects of the present disclosure are capable of use in various other combinations and environments and are capable of changes or modifications within the scope of the inventive concept as expressed herein. For instance, the following modifications according to aspects of the present disclosure are feasible.

In the aforementioned illustrative embodiment, an example has been presented in which the message representing that there is an insufficient amount of print medium remaining in the printer 50*d* is displayed on the selectable button 112*d*, based on the status information included in the received advertising packet. Nonetheless, any type of message may be displayed on the selectable buttons 112, based on the status information included in the received advertising packet. Exemplary messages displayable on the selectable buttons 112 may include, but are not limited to, a message representing that the cover is open, a message representing that there is an insufficient amount of consumable (e.g., ink) remaining, and a message representing that printing is currently in progress.

Further, in the aforementioned illustrative embodiment, the terminal device 10 obtains the configuration information included in the advertising packet received from each communicable printer 50 via BLE communication, and thereafter transmits the image data and the print instruction to the selected printer via BLE communication established between the terminal device 10 and the selected printer. Nonetheless, the communication method for receiving the configuration information and the communication method for transmitting the image data and the print instruction may be different from each other. For instance, after establishment of the BLE communication with the selected printer in S138 and S140, the terminal device 10 may obtain, from the selected printer, address information for communicating with the selected printer via a different communication technology (e.g., Wi-Fi or Wi-Fi direct). Then, the terminal device 10 may transmit, to the selected printer, an instruction to establish communication using the different communication technology. After establishment of the communication using the different communication technology, the terminal device may transmit the image data and the print instruction via the established communication.

In the aforementioned illustrative embodiment, the barcode printing display setting is set by a user operation via the setting screen. Nonetheless, when an object as a target image to be printed is a barcode, the barcode printing display setting may be automatically set. Specifically, when an object which the user is editing with the control program 30 is a barcode, one or more printers incapable of barcode printing may be automatically filtered such that only preview images corresponding to the printers capable of barcode printing are displayed on the selection screen 110.

Further, in the aforementioned illustrative embodiment, the BLE communication is exemplified as available communication between the terminal device 10 and 50 and the printers 50*a* to 50*f*. Nonetheless, any other communication method (e.g., near field communication) may be employed therebetween as long as the communication method is compliant with one of short-range wireless communication standards.

Figure 2:
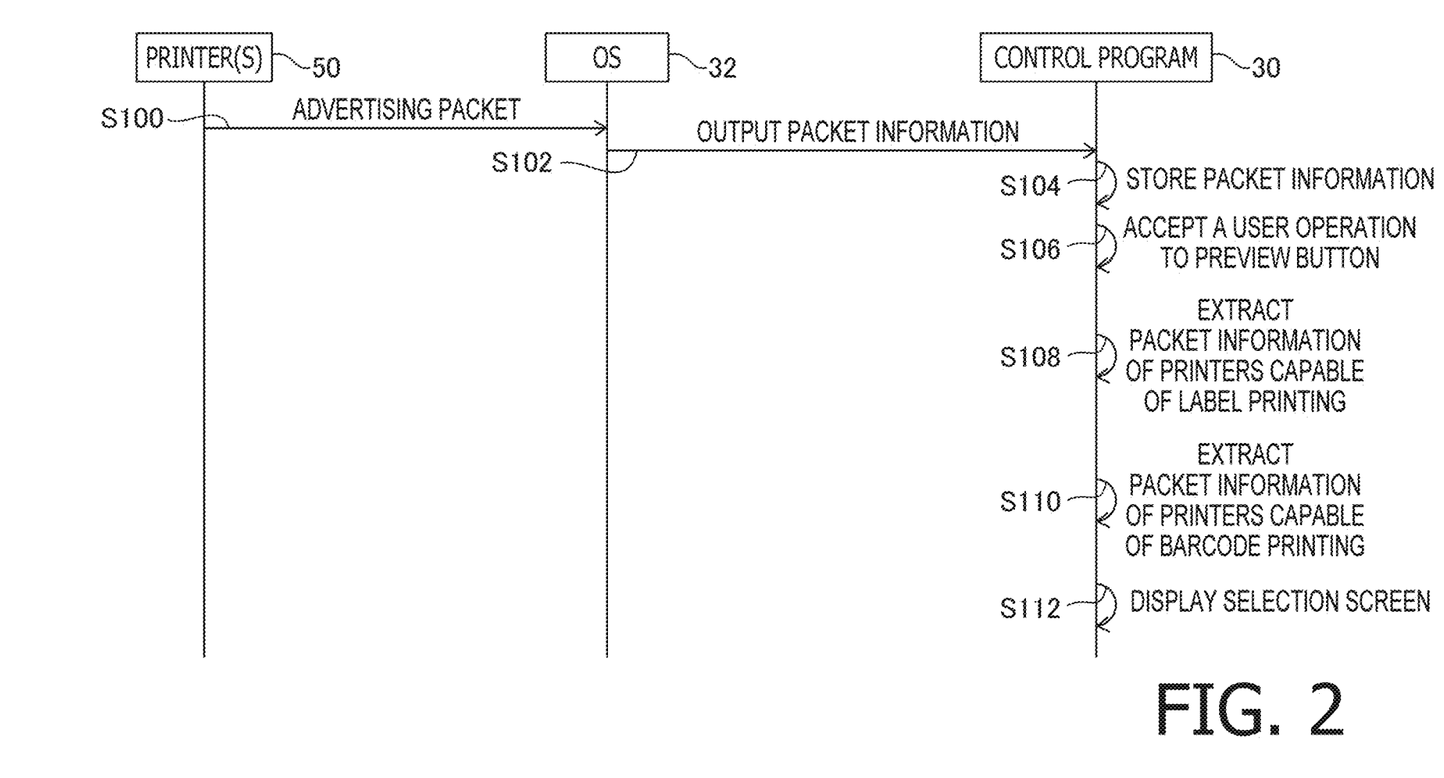
FIGS. 2 to 4 are sequence diagrams showing a sequence of processes in the communication system of the illustrative embodiment according to one or more aspects of the present disclosure.
Figure 3:
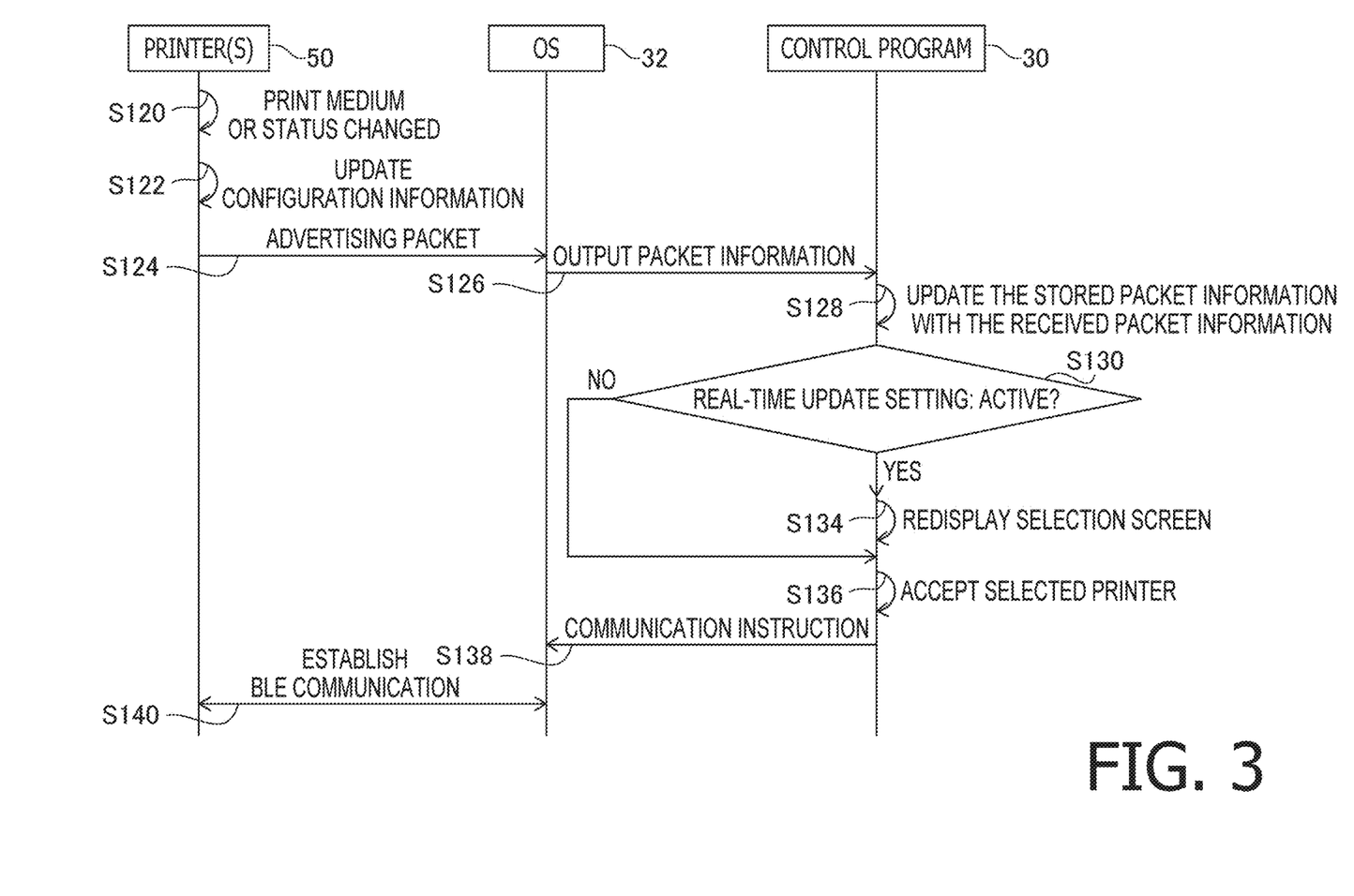
Figure 4:
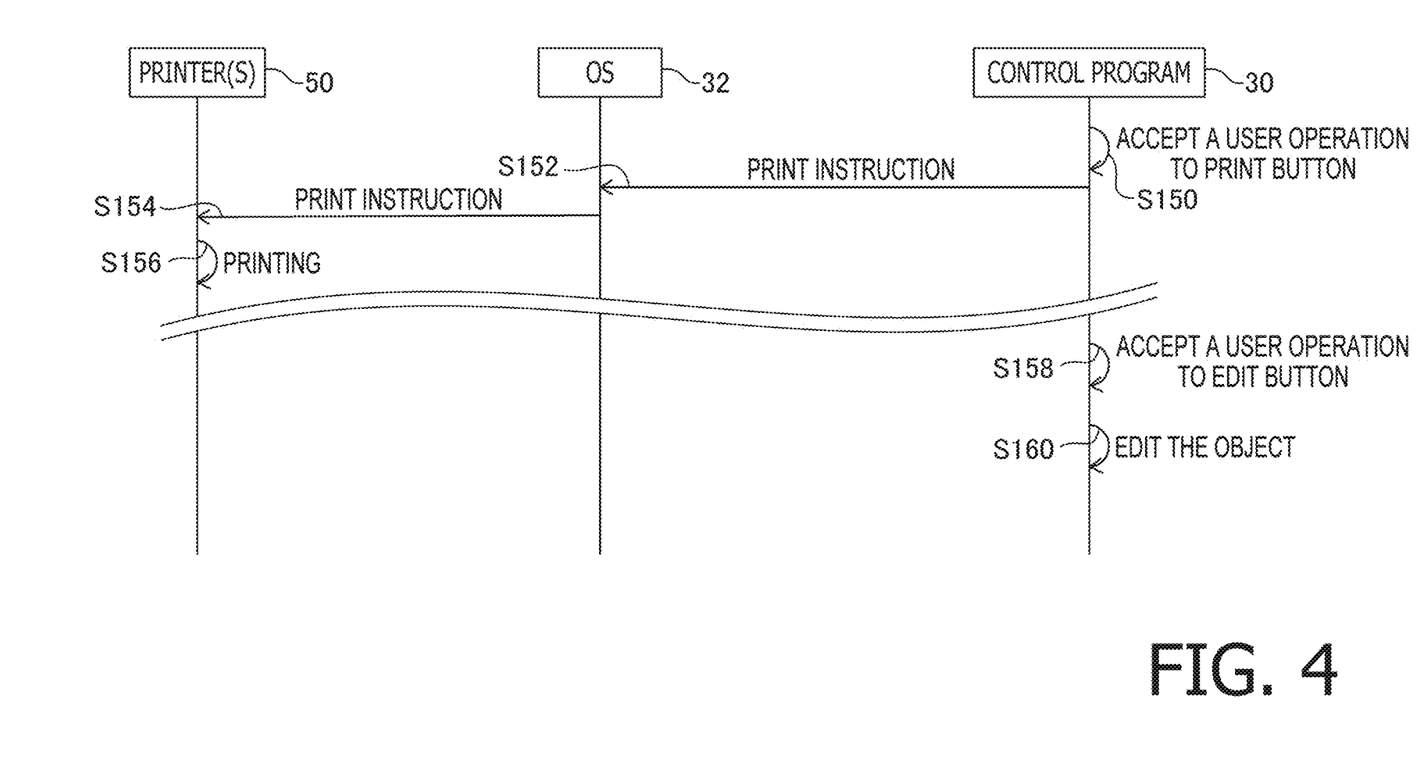

In the aforementioned illustrative embodiment, as exemplified with reference to FIGS. 2 to 4, the processes to be implemented on the terminal device 10 are performed by the CPU 12. Nonetheless, the processes to be implemented on the terminal device 10 may be performed by another logic integrated circuit such as an ASIC. In another instance, at least two of CPUs and other logic integrated circuits such as ASICs may perform the processes in cooperation with each other.

Associations between elements exemplified in the aforementioned illustrative embodiments and elements according to aspects of the present disclosure will be exemplified below. The terminal device 10 may be an example of a "terminal device" according to aspects of the present disclosure. Further, as described above, examples of the terminal device 10 may include, but are not limited to, mobile terminals such as notebook PCs, smartphones, and tablet PCs. The CPU 12 may be an example of a "processor" according to aspects of the present disclosure, and may be an example of a "second controller" according to aspects of the present disclosure. The memory 14 may be an example of a "non-transitory computer-readable medium" according to aspects of the present disclosure. The control program 30 may be an example of "computer-readable instructions" stored in the "non-transitory computer-readable medium" according to aspects of the present disclosure. The short-range wireless communication I/F 20 may be an example of a "communication interface" according to aspects of the present disclosure, and may be an example of a "second communication interface" according to aspects of the present disclosure. The display 16 may be an example of a "display" according to aspects of the present disclosure. The communication system 1 may be an example of a "communication system" according to aspects of the present disclosure. The printers 50*a* to 50*f* may be included in examples of "one or more printers" according to aspects of the present disclosure. The short-range wireless communication I/F 62 may be an example of a "first communication interface" according to aspects of the present disclosure. The CPU 52 may be an example of a "first controller" according to aspects of the present disclosure.

What is claimed is:

1. A non-transitory computer-readable medium storing computer-readable instructions that are executable by a processor coupled with a terminal device comprising a short-range wireless communication interface and a display, the computer-readable instructions being configured to, when executed by the processor, cause the terminal device to:

receive, via the short-range wireless communication interface, configuration information from each of one or more printers positioned within a communicable range of short-range wireless communication with the terminal device, each configuration information representing a configuration of a corresponding one of the one or more printers;

control the display to display one or more selectable printers and one or more preview images based on the received configuration information and an object printable by the one or more selectable printers, the one or more selectable printers being extracted from the one or more printers based on the received configuration information, each preview image representing an image of the object in accordance with the configuration information of a corresponding selectable printer;

accept a selection from the one or more selectable printers displayed on the display;

transmit, to a selected printer identified by the accepted selection, a communication instruction to establish communication between the terminal device and the selected printer; and transmit a print instruction to the selected printer via the established communication.

2. The non-transitory computer-readable medium according to claim 1, wherein the computer-readable instructions are further configured to, when executed by the processor, cause the terminal device to:

receive the configuration information and communication information from each printer via the short-range wireless communication interface, each communication information being for communicating with a corresponding printer; and transmit the print instruction to the selected printer via the established communication by using the communication information of the selected printer.

3. The non-transitory computer-readable medium according to claim 1, wherein each configuration information includes print medium information representing a print medium set for the corresponding printer, and wherein the computer-readable instructions are further configured to, when executed by the processor, cause the terminal device to:

control the display to display the one or more selectable printers and the one or more preview images based on the print medium information included in the received configuration information and the object printable by each selectable printer, each preview image being an image of the object inserted onto the print medium represented by the print medium information of the corresponding selectable printer.

4. The non-transitory computer-readable medium according to claim 1, wherein each configuration information includes status information representing a status of the corresponding printer, and wherein the computer-readable instructions are further configured to, when executed by the processor, cause the terminal device to:

control the display to display the status of each selectable printer that is represented by a corresponding piece of the status information included in the received configuration information.

5. The non-transitory computer-readable medium according to claim 1, wherein each printer is configured to, when the configuration thereof is changed, update the configuration information, and wherein the computer-readable instructions are further configured to, when executed by the processor, cause the terminal device to:

receive, via the short-range wireless communication interface, the updated configuration information from at least one printer of which the configuration has been changed; and when receiving the updated configuration information while the one or more preview images are being displayed on the display, control the display to display, instead of the one or more preview images being displayed, one or more new preview images based on the updated configuration information and the object.

6. The non-transitory computer-readable medium according to claim 1, wherein the computer-readable instructions are further configured to, when executed by the processor, cause the terminal device to:

extract one or more pieces of configuration information conforming to particular configuration information, from among all the received configuration information; and control the display to display the one or more selectable printers and the one or more preview images, based on the extracted one or more pieces of configuration information and the object.

7. The non-transitory computer-readable medium according to claim 1, wherein each configuration information includes print medium information representing a print medium set for the corresponding printer, and wherein the computer-readable instructions are further configured to, when executed by the processor, cause the terminal device to:

extract one or more pieces of configuration information each of which includes the print medium information representing a print medium suitable for printing the object, from among all the received configuration information; and control the display to display the one or more selectable printers and the one or more preview images, based on the extracted one or more pieces of configuration information and the object.

8. The non-transitory computer-readable medium according to claim 1, wherein each printer is configured to transmit a beacon signal including the configuration information in accordance with a standard of the short-range wireless communication, and wherein the computer-readable instructions are further configured to, when executed by the processor, cause the terminal device to receive the beacon signal from each printer, thereby receiving the configuration information included in the beacon signal.

9. The non-transitory computer-readable medium according to claim 1, wherein the computer-readable instructions are further configured to, when executed by the processor, cause the terminal device to edit the object in accordance with a user operation.

10. A communication system comprising:
a terminal device; and one or more printers positioned within a communicable range of short-range wireless communication with the terminal device, each printer comprising:
   a first communication interface configured to perform the short-range wireless communication with the terminal device; and
   a first controller configured to transmit configuration information representing a configuration of each printer,
wherein the terminal device comprises:
   a display;
   a second communication interface configured to perform the short-range wireless communication with the one or more printers; and
   a second controller configured to:
     receive, via the second communication interface, the configuration information from each printer;
     control the display to display one or more selectable printers and one or more preview images based on the received configuration information and an object printable by the one or more selectable printers, the one or more selectable printers being extracted from the one or more printers based on the received configuration information, each preview image representing an image of the object in accordance with the configuration information of a corresponding selectable printer;
     accept a selection from the one or more selectable printers displayed on the display;
     transmit, to a selected printer identified by the accepted selection, a communication instruction to establish communication between the terminal device and the selected printer; and
     transmit a print instruction to the selected printer via the established communication, and
wherein the first controller of the selected printer is further configured to:
   receive the print instruction from the terminal device; and
   perform printing in accordance with the received print instruction.

11. The communication system according to claim 10, wherein the first controller of each printer is further configured to:
   when the configuration thereof is changed, update the configuration information; and
   transmit the updated configuration information via the first communication interface, and
wherein the second controller of the terminal device is further configured to:
   receive, via the second communication interface, the updated configuration information from at least one printer of which the configuration has been changed; and
   when receiving the updated configuration information while the one or more preview images are being displayed on the display, control the display to display, instead of the one or more preview images being displayed, one or more new preview images based on the updated configuration information and the object.

12. A method implementable on a processor coupled with a terminal device comprising a short-range wireless communication interface and a display, the method comprising:
   receiving, via the short-range wireless communication interface, configuration information from each of one or more printers positioned within a communicable range of short-range wireless communication with the terminal device, each configuration information representing a configuration of a corresponding one of the one or more printers;
   controlling the display to display one or more selectable printers and one or more preview images based on the received configuration information and an object printable by the one or more selectable printers, the one or more selectable printers being extracted from the one or more printers based on the received configuration information, each preview image representing an image of the object in accordance with the configuration information of a corresponding selectable printer;
   accepting a selection from the one or more selectable printers displayed on the display;
   transmitting, to a selected printer identified by the accepted selection, a communication instruction to establish communication between the terminal device and the selected printer; and
   transmitting a print instruction to the selected printer via the established communication.

\* \* \* \* \*

UNITED STATES PATENT AND TRADEMARK OFFICE
CERTIFICATE OF CORRECTION

| | | |
|---|---|---|
| PATENT NO. | : 10,915,274 B2 | Page 1 of 1 |
| APPLICATION NO. | : 16/536965 | |
| DATED | : February 9, 2021 | |
| INVENTOR(S) | : Ryo Yasui | |

It is certified that error appears in the above-identified patent and that said Letters Patent is hereby corrected as shown below:

On the Title Page

Item (73) Assignee should read:
Brother Kogyo Kabushiki Kaisha
Nagoya (JP)

Signed and Sealed this
Fourteenth Day of November, 2023

Katherine Kelly Vidal
*Director of the United States Patent and Trademark Office*